Patented July 9, 1929.

1,719,920

UNITED STATES PATENT OFFICE.

CLAYTON W. BEDFORD, OF AKRON, OHIO, ASSIGNOR TO THE B. F. GOODRICH COMPANY, OF NEW YORK, N. Y., A CORPORATION OF NEW YORK.

RUBBER COMPOSITION AND METHOD OF PRODUCING THE SAME.

No Drawing. Application filed February 18, 1924. Serial No. 693,718.

This invention relates to the vulcanization of rubber or similar plastic by the aid of organic accelerators or vulcanizing agents which contain sulfur directly linked to nitrogen.

Organic accelerators of vulcanization such as diethylamine are so volatile that direct milling of the amine into rubber compounds is impractical due to volatilization of the amine. Accelerators such as piperidine possess such a foul odor that they have found little direct use in rubber mixes. It has been customary to use both classes of amines in the form of their reaction products with carbon-disulfide whereby both of the difficulties mentioned are avoided. Such derivatives, however, are comparatively low in accelerating power in the absence of metallic oxides, and, on the other hand, when used with metallic oxides they cause scorching or premature vulcanization during factory processing.

The object of this invention is to provide a new class of nonvolatile derivatives of volatile accelerators. A further object is to provide a new class of disulfides and polysulfides which are direct vulcanizing agents in the absence of free sulfur. A still further object is to provide derivatives of organic amines which possess high curing power, such curing power being still further increased by the presence of zinc oxide without danger of air curing or scorching. Another object is to provide a new class of accelerators which will produce less hydrogen sulfide during vulcanization than is formed from the original amine, such accelerators for this reason being of especial value in ebonite mixes.

Smit, (Ber. 8, 1445) has described the reaction products of sulfur chlorides on aniline, whereby only the hydrogen of the amido group is reacted upon. Coffey, (Rec. Trav. Chim. 40, 747, 1921) later obtained a similar reaction product which he described as the sulfur analog of nitro benzene. The formulas given for these sulfur compounds are as follows:

I. 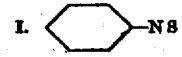

II. 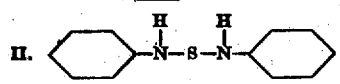

III. 

It is entirely probable that Smit also obtained a compound having the Formula (IV) and that the compound of Coffey may be a dimer of form III, containing trivalent instead of pentavalent nitrogen as shown in Formula (V).

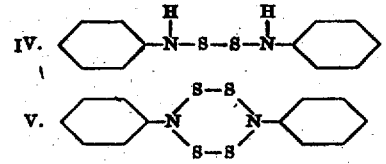

I find that these compounds and many others of a similar nature wherein one or more sulfur atoms are linked directly to nitrogen, are in general accelerators of exceptional value and that those which contain two or more sulfur atoms in the molecule are direct vulcanizing agents for rubber in the absence of free sulfur.

*Example 1.*—A mix comprising 100 parts by weight of rubber and 12 parts of the n-dithioaniline of Coffey (III) or (V) will give a well vulcanized product in 50 minutes at 287° F. without the presence of free sulfur. (12 parts of the n-dithioaniline has a sulfur content corresponding to 5% on the rubber). The vulcanized product is dark colored and shows no sulfur bloom. If excess of the vulcanizing agent is used the cured product frequently develops a sulfur bloom showing that sulfur has been liberated during the heating process.

*Example 2.*—Rubber—100, sulfur—6, zinc oxide—10, n-dithioaniline—3 (parts by weight). This mix gives a well vulcanized product in 45 minutes at 287° F. and tensile strengths ranging from 3100 lbs. per sq. in. at 60 minutes to 3870 lbs. per sq. in. at 120 minutes.

*Example 3.*—By substituting in Example 2 a product prepared by the reaction of four mols of aniline on one mol of $S_2Cl_2$, which product probably has Formula (IV), given above, the tensile strengths range from 2900 lbs. per sq. in. at 60 minutes to 3550 lbs. per sq. in. at 120 minutes.

There are many other primary amines, both aliphatic and aromatic, which will react with $S_2Cl_2$ or $SCl_2$ to produce compounds wherein sulfur is directly linked to nitrogen, such reactions being preferably carried out after dilution of the amine with an inert solvent and by the use of low temperatures (32 to 100° F.). The following amines are examples: p-toluidine, p-amido dimethyl-aniline, ethylamine, ethylenediamine, propylamine, butylamine, amylamine.

*Example 4.*—The reaction product of 3 mols of butylamine with 1 mol of $S_2Cl_2$, after removal of the amine hydrochloride, is found to be a powerful vulcanizing agent, giving a snappy cure with high tensile strength when compounded with rubber without free sulfur, in a proportion equivalent to 5% of sulfur on the rubber, and cured for 45 minutes at 287° F.

Michaelis, (Ber. 28, 166 and 1016) has described the reaction of secondary amines such as piperidine and diethylamine which reaction products have formulæ respectively as follows:

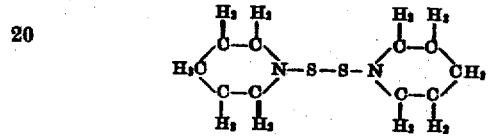

*Example 5.*—n-Dithio-diethylamine, (VII), is mixed directly into rubber in the usual manner and cured for 45 minutes at 287° F. The following figures represent parts per 100 parts of rubber:

| Disulfide | Sulfur equivalent | Cure |
|---|---|---|
| 2.26 | 0.7 | Slightly undercured. |
| 4.64 | 1.4 | O K cure. |
| 8.13 | 2.5 | Over cure. |
| 16.25 | 5.0 | Badly overcured. |

These vulcanizates show high tensile strengths when properly cured, are non-blooming and are frequently transparent.

*Example 6.*—n-Dithiopiperidine, (VI), is substituted in molar proportions for the n-dithiodiethylamine of Example 5 with substantially the same results.

The reaction products of sulfur chloride ($S_2Cl_2$) on aromatic amines such as diphenylamine or dimethylaniline, as described in the literature, are also dithio compounds, but in such the sulfur is linked to carbon and not to nitrogen. Such disulfides are also prepared by the direct action of sulfur on the amine at high temperatures. They do not act as direct vulcanizing agents for rubber although they are frequently very active as accelerators. Such sulfur compounds wherein the sulfur is not linked directly to nitrogen do not come within the scope of this invention.

The n-sulfides prepared from amines and $SCl_2$ have the power to take up sulfur, probably forming the same disulfides as prepared from $S_2Cl_2$, and these disulfides easily dissolve additional sulfur to form polysulfides which differ from such polysulfides as $(NH_4)_2S_5$ in that the nitrogen is trivalent instead of pentavalent. These trivalent-nitrogen, disulfide-polysulfides may also be made directly by dissolving sulfur in $S_2Cl_2$ before reacting on the amine.

A still further method of producing dithio compounds containing trivalent nitrogen wherein surfur is attached to nitrogen, is to mix primary or secondary aliphatic amines, either cyclic or open chain, such as butylamine, ethylenediamine, diethylamine, piperidine, benzylamine, triacetoneamine or vinyldiacetoneamine, with sulfur at ordinary temperatures. Disulfides and polysulfides of both tri- and pentavalent nitrogen are simultaneously formed as illustrated by the following equations, wherein R represents hydrogen, an alkyl group or its equivalent.

VIII. $R_2NH + S \rightarrow R_2NSH$

IX. $2R_2NSH + S \rightarrow$
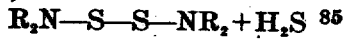
$R_2N-S-S-NR_2 + H_2S$

X. $2R_2NH + H_2S \rightarrow (R_2NH_2)_2S$

XI. $R_2N-S-S-NR_2 + S_x \rightarrow$
$R_2N-S(S_x)S-NR_2$

XII. $(R_2NH_2)_2S + S_x \rightarrow (R_2NH_2)_2S-S_x$

This mixture may be treated with a metallic oxide such PbO, whereby the red pentavalent polysulfides (XII) are decomposed.

$(R_2NH_2)_2S-S_x$

The liberated sulfur and amine then react as before to form compounds (VIII), (IX) and (XI). The preferred method, therefore, for forming compounds of the three types, of (VIII), (IX) and (XI) is to mix strongly basic amines with sulfur and litharge, whereby the hydrogen sulfide formed is changed to lead sulfide and the yield of the desired trivalent-nitrogen sulfiides is increased.

*Example 7.*—Diethylamine monohydrate—360, sulfur—128 and litharge—600 (parts by weight are shaken together until the heat of reaction has been spent and the liquid is cold. The lead sulfide is removed by extraction with benzene and the solvent and excess amine are evaporated. The residue comprises 200 parts by weight of a light yellow oil which will not react with carbondisulfide, precipitates sulfur and forms the amine hydrochloride and hydrogen sulfide on treatment with dilute hydrochloric acid, is volatile in steam and violently decomposes on dry distillation. This oil is believed to be the polysulfide of form (VII), with a formula probably that of form (XI). This oil is a direct vulcanization agent as well as a strong accelerator.

*Example 8.*—The figures in the following table represent parts by weight. The accelerator is the product of Example 7.

| Mix | 1 | 2 | 3 | 4 | 5 | 6 |
|---|---|---|---|---|---|---|
| Rubber | 100 | 100 | 100 | 100 | 100 | 100 |
| Zinc oxide | | 10 | 10 | 10 | 10 | 10 |
| Sulfur | 5 | 5 | 2 | 1 | | |
| Accelerator | 1 | 1 | 1 | 2 | .3 | 4 |

Cures at 287° F.

| Mix | Time Minutes | Tensile strength in lbs. per sq. in. |
|---|---|---|
| 1 | 30 | 2000 |
| 2 | 30 | 3450 |
| 3 | 60 | 3250 |
| 4 | 60 | 3625 |
| 5 | 60 | 3000 |
| 6 | 60 | 3575 |

*Example 9.*—A mix comprising rubber—100, sulfur—37, and the oil described in Example 7—2, (parts by weight) will cure to a hard rubber in 90 minutes at 303° F. whereas the same mix using one part of zinc dimethyl dithiocarbamate remains soft and is easily bent by the hand when cured under the same conditions.

*Example 10.*—Piperidine—300, sulfur—96 and litharge—450 (parts by weight) are mixed in a small amount of benzene and shaken until the heat of reaction has subsided. The product is separated from lead sulfide by benzene extraction and the solvent evaporated. The yield is 207 grams of solid. The main reaction product corresponds in its properties to the n-dithio-piperidine of Michaelis, (VI), and due to its higher sulfur content is probably a polysulfide having a formula similar to form (XI).

*Example 11.*—The accelerator in the following table is the product formed as in Example 10, after the separation of the comparatively insoluble lead compounds which are formed in small amounts.

| Mix | 1 | 2 | 3 | 4 | 5 | 6 |
|---|---|---|---|---|---|---|
| Rubber | 100 | 100 | 100 | 100 | 100 | 100 |
| Zinc oxide | | 10 | 10 | 10 | 10 | 10 |
| Sulfur | 5 | 5 | 2 | 1 | | |
| Accelerator | 1 | 1 | 1 | 2 | 3 | 4 |

| Mix | Time min. | Tensile strength in lbs. per sq. in. |
|---|---|---|
| 1 | 40 | 2750 |
| 2 | 40 | 4750 |
| 3 | 60 | 4750 |
| 4 | 40 | 4050 |
| 5 | 30 | 3025 |
| 6 | 30 | 3800 |

In general the vulcanizing agents and accelerators which contain sulfur linked directly to trivalent nitrogen are characterized by the following properties.

1. They are less volatile than the original amine.
2. They generate less hydrogen sulfide than the amine during the vulcanization process.
3. The disulfides or disulfide-polysulfides are direct vulcanizing agents.
4. As accelerators they are more active in the presence of metallic oxides.
5. They are solvents for and are convenient agents for carrying both sulfur and selenium into a rubber mix.

I do not wholly limit myself to any specific method of preparation of these accelerators or vulcanizing agents. Neither do I wholly limit my claims to definite proportions, nor to the presence of other ingredients, in a rubber mix, since proportions or ingredients may be varied according to the use for which the vulcanized product is intended.

I claim:

1. The method of vulcanizing rubber or similar plastic, which comprises heating a mixture or rubber and a polysulfide of a thioamine comprising the group $$R_2N-S-S-NR_2,$$

wherein R represents hydrogen or an organic radical.

2. A composition of matter comprising the vulcanization product of a mixture of rubber, or similar plastic, and polysulfide of a thioamine comprising the group $$R_2N-S-S-NR_2,$$

wherein R represents hydrogen or an organic radical.

3. The method of vulcanizing rubber or similar plastic which comprises heating a mixture of rubber and polysulfide of a thioamine.

4. The method of vulcanizing rubber or similar plastic which comprises heating a mixture of rubber and the reaction product of sulfur, sulfur chloride and an organic amine.

5. The method of vulcanizing rubber or similar plastic which comprises heating a mixture of rubber and a disulfide-polysulfide derivative of an organic amine.

6. The method of vulcanizing rubber or similar plastic which comprises heating a mixture or rubber and a disulfide-polysulfide derivative of an aliphatic amine.

7. The method of vulcanizing rubber or similar plastic which comprises heating a mixture including rubber, a vulcanizing agent, and a polysulfide of a thioamine.

8. The method of vulcanizing rubber or similar plastic which comprises heating a mixture including rubber, a vulcanizing agent, and a disulfide-polysulfide derivative of an organic amine.

9. The method of vulcanizing rubber or similar plastic which comprises heating a mixture including rubber, a vulcanizing agent, and the reaction product of sulfur, sulfur chloride and an organic amine.

10. A composition of matter comprising the vulcanization product of a mixture including rubber, or similar plastic, a vulcanizing agent, and a polysulfide of a thio-amine.

11. A composition of matter comprising the vulcanization product of a mixture including rubber, or similar plastic, a vulcanizing agent, and a disulfide-polysulfide derivative of an organic amine.

In witness whereof I have hereunto set my hand this 13th day of February, 1924.

CLAYTON W. BEDFORD.

Certificate of Correction

Patent No. 1,719,920.      Granted July 9, 1929, to

CLAYTON W. BEDFORD

It is hereby certified that error appears in the printed specification of the above numbered patent requiring correction as follows: Page 2, line 20, prior to the structural formula insert the Roman numeral VI.; same page, after line 24, insert

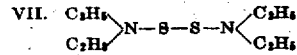

line 72, for the misspelled word "surfur" read *sulfur;* strike out line 91, and insert instead

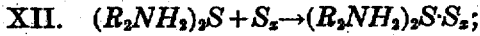

strike out line 97 and insert instead

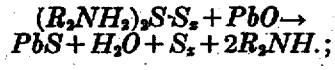

page 3, line 118, claim 6, for the word "or" read *of;* and that the said Letters Patent should be read with these corrections therein that the same may conform to the record of the case in the Patent Office.

Signed and sealed this 19th day of August, A. D. 1930.

[SEAL.]

M. J. MOORE,
*Acting Commissioner of Patents.* mixture including rubber, a vulcanizing agent, and the reaction product of sulfur, sulfur chloride and an organic amine.

10. A composition of matter comprising the vulcanization product of a mixture including rubber, or similar plastic, a vulcanizing agent, and a polysulfide of a thio-amine.

11. A composition of matter comprising the vulcanization product of a mixture including rubber, or similar plastic, a vulcanizing agent, and a disulfide-polysulfide derivative of an organic amine.

In witness whereof I have hereunto set my hand this 13th day of February, 1924.

CLAYTON W. BEDFORD.

Certificate of Correction

Patent No. 1,719,920.  Granted July 9, 1929, to

CLAYTON W. BEDFORD

It is hereby certified that error appears in the printed specification of the above numbered patent requiring correction as follows: Page 2, line 20, prior to the structural formula insert the Roman numeral VI.; same page, after line 24, insert

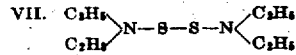

line 72, for the misspelled word "surfur" read *sulfur*; strike out line 91, and insert instead XII.  $(R_2NH_2)_2S + S_x \rightarrow (R_2NH_2)_2S \cdot S_x;$ strike out line 97 and insert instead $(R_2NH_2)_2S \cdot S_x + PbO \rightarrow PbS + H_2O + S_x + 2R_2NH;$ page 3, line 118, claim 6, for the word "or" read *of;* and that the said Letters Patent should be read with these corrections therein that the same may conform to the record of the case in the Patent Office.

Signed and sealed this 19th day of August, A. D. 1930.

[SEAL.]

M. J. MOORE,
*Acting Commissioner of Patents.*